US005797026A

United States Patent [19]

Rhodehamel et al.

[11] Patent Number: 5,797,026
[45] Date of Patent: Aug. 18, 1998

[54] METHOD AND APPARATUS FOR SELF-SNOOPING A BUS DURING A BOUNDARY TRANSACTION

[75] Inventors: Michael W. Rhodehamel, Beaverton; Nitin V. Sarangdhar, Woodland; Amit A. Merchant, Portland; Matthew A. Fisch; James M. Brayton, both of Beaverton, all of Oreg.

[73] Assignee: Intel Corporation, Santa Clara, Calif.

[21] Appl. No.: 921,845

[22] Filed: Sep. 2, 1997

Related U.S. Application Data

[63] Continuation of Ser. No. 679,744, Jul. 15, 1996, abandoned, which is a continuation of Ser. No. 205,015, Feb. 28, 1994, abandoned.

[51] Int. Cl.[6] ........................................... G06F 13/00
[52] U.S. Cl. ................................ 395/800.01; 711/146
[58] Field of Search ......................... 395/800.01, 670, 395/250, 842, 851, 840, 856, 287, 292, 200.3, 200.43; 711/113, 118, 130, 141, 146; 364/131–134

[56] References Cited

U.S. PATENT DOCUMENTS

| 4,959,777 | 9/1990 | Holman, Jr. ............................ 395/325 |
|---|---|---|
| 5,072,369 | 12/1991 | Theus et al. ............................ 395/425 |
| 5,119,485 | 6/1992 | Ledbetter, Jr. et al. ................ 395/425 |
| 5,341,487 | 8/1994 | Derwin et al. .......................... 395/425 |
| 5,345,578 | 9/1994 | Manasse ................................ 395/425 |
| 5,386,511 | 1/1995 | Murata et al. .......................... 395/200 |
| 5,420,991 | 5/1995 | Konigsfeld et al. ................... 395/375 |
| 5,528,764 | 6/1996 | Heil ....................................... 395/293 |
| 5,551,006 | 8/1996 | Kulkazzi ................................ 395/473 |

OTHER PUBLICATIONS

"The Metaflow Architecture", Val Popescu, Merle Schults, John Spracklen, Gary Gibson, Bruce Lightner and David Isaman, IEEE Micro, Jun. 1991 (pp. 10–13, 63–73).

Primary Examiner—Alpesh M. Shah
Attorney, Agent, or Firm—Blakely, Sokoloff, Taylor & Zafman

[57] ABSTRACT

A self-snooping mechanism for enabling a processor being coupled to dedicated cache memory and a processor-system bus to snoop its own request issued on the processor-system bus. The processor-system bus enables communication between the processor and other bus agents such as a memory subsystem, I/O subsystem and/or other processors. The self-snooping mechanism is commenced upon determination that the request is based on a boundary condition so that initial internal cache lookup is bypassed to improve system efficiency.

30 Claims, 8 Drawing Sheets

METHOD AND APPARATUS FOR SELF-SNOOPING A BUS DURING A BOUNDARY TRANSACTION

This is a Rule 1.62 Continuation of application Ser. No. 08/679,744, filed Jul. 5, 1996, now abandoned, which is a Rule 1.62 Continuation of application Ser. No. 08/205,015, filed Feb. 28, 1994, now abandoned.

BACKGROUND OF THE INVENTION

1. Field of the Invention

The present invention relates to the field of computer system buses. More particularly, this invention relates to a method and apparatus for providing a self-snooping mechanism to maintain cache coherency within a computer system.

2. Background of the Invention

Each and every year, manufacturers in the computer field develop computer systems with enhanced speed and performance capabilities. Such enhancements are usually accomplished by advances in and/or additional uses of cache memory ("cache"). Cache comprises a plurality of cache lines, wherein each of the cache lines includes (i) data; (ii) state information indicating at least the validity of the data; and (iii) a tag acting as an address for the cache line.

In modern computer systems, it is common to interconnect multiple "caching agents" to a processor-system bus to further enhance system performance. A caching agent is any device coupled to a dedicated cache and the processor-system bus, wherein the caching agent is a subset of a "bus agent" being any device coupled to the processor-system bus. Notwithstanding enhanced system performance, computer systems having multiple caches must maintain cache coherency. Cache coherency refers to all caches agreeing on which cache(s) has the most current version of a particular cache line. A conventional manner of ensuring cache coherency is to configure state information within a cache to operate according to management protocol(s) and to implement a chosen snooping mechanism (i.e. a mechanism for allowing other caching agents to monitor requests by a particular caching agent on the processor-system bus).

There exist many cache management configurations currently being used by modern computer systems. One such common configuration is "writeback" in which write misses cause cache lines to be allocated and write hits cause memory to be updated entirely within the cache, whenever possible. A conventional M.E.S.I. (Modified, Exclusive, Shard, or Invalid) protocol often is used in conjuction with writeback caches. The M.E.S.I. protocol represents four (4) states which define whether a cache line is valid (i.e., not in Invalid state); available in other caches (i.e., in shared or Exclusive state); or if the cache line has been updated with new information without concurrently updating main memory (i.e., in Modified state, commonly referred to as "dirty" state). The M.E.S.I. protocol is effective for transactions invoking an internal cache lookup before issuing a bus transaction. However, for those transactions requiring immediate issuance on the processor-system bus without internal cache lookup (hereinafter referred to as a "boundary transaction"), another cache management mechanism in cooperation with the M.E.S.I. protocol is typically necessary.

One such boundary transaction requiring another cache management mechanism occurs in bus-lock operations. A bus-lock operation provides uninterrupted, synchronous bus transactions by a requesting agent (i.e., the agent requesting a particular transaction) in order to reduce data bus bandwidth and prevent unwanted interruption by other bus agents. However, problems often arise during the bus-lock operation such as, for example, accessing a variable using a bus-lock operation when such variable resides in Modified state in the requesting agent. In such case, the processor-system bus is locked to prevent interruption but the most recent value of the variable needs to be retrieved from the requesting agent's cache.

Prior Intel® Architecture Microprocessors (e.g., Intel's Pentium™ microprocessor) overcame this problem by performing a "tickle read" of its cache (in combination with other transactions) prior to initiating the bus-lock operation. A tickle read is a mechanism used to ascertain whether the desired bus-lock variable is stored in a cache line of a particular cache as well as a cache state of the particular cache line, without returning the information to the prior Intel® Architecture Microprocessor. If the particular cache line is in Modified state so that a stale version of the bus-lock variable resides in main memory, the prior Intel® Microprocessor Architecture issues another transaction, namely an "explicit writeback", which is a write transaction originating from the prior Intel® Microprocessor Architecture that evicts the particular cache line containing the bus-lock variable onto the processor-system bus to update main memory. Thereafter, the bus-lock operation is guaranteed to read the cache line from the processor-system bus and receive the most recent (non-stale) version of the bus-lock variable from main memory. Without this, the prior Intel® Architecture Microprocessor might falsely conclude that it had exclusive access to some crucial system resource, resulting in incorrect program behavior.

While this solution is effective, it is not efficient due to the requirement of undergoing tickle read and explicit writeback transactions prior to commencement of the bus-lock operation. As a result, several bus cycles are needlessly wasted, decreasing the overall speed of the computer system. This is due to the fact that any particular delay in issuing a request has an adverse effect of stalling all requests not yet issued by the same particular delay. When many such requests are delayed, as in the case when bus agents are continually examining the bus-lock variable, such delays can have a visible effect on system performance. Furthermore, as processors become smaller and smaller, efficient use of a limited amount of space is becoming increasingly important. Thus, to avoid a large number of logic gates, complex pre-transaction read and write transactions are avoided.

Another boundary transaction relates to a page attribute conflict for processors supporting speculative instruction execution ("speculative processors"). In modern computer systems, at initialization, different types of memory are allocated to different memory address regions within physical memory. For example, the first 500 kilobytes ("500K") of physical memory may be designated for writeback memory, the next 500K possibly designated for write-through memory and the like.

These initial physical memory address regions, however, can be programmably altered in software by modifying a page attribute register. The page attribute register enables the physical memory to be allocated differently for efficiency reasons, normally in page granularity (4K block sizes). As a result, conflicts may arise with respect to the type of memory originally designated as one memory type and thereafter being programmed as another memory type. For example, a particular memory location is designated as cacheable memory (e.g., write-through cache) and is used accordingly, and thereafter, that particular memory location is programmed as non-cacheable.

In the event of page attribute conflicts, the prior Intel® Architecture Microprocessor resolved this conflict by simply reading from cache, ignoring the memory space modification by the page attribute register. However, for speculation processors, the above-described resolution is not a viable option. This is due to the fact that speculative instruction execution enables the processor to execute an instruction that may or may not be part of the execution stream (such as an instruction followed by a conditional branch), so long as the processor can undo the instruction's effect if it is not part of the execution stream. As a result, information in the form of an instruction, data, etc. may be in a processor's cache, although a user's program never accesses that information. Hence, the cache state cannot be never trusted if it conflicts with the page attributes.

Other difficult boundary conditions resulting in boundry transactions, can arise from the specific hardware configuration of the computer system. Hence, it would be advantageous to manage these boundary transactions through a common mechanism.

SUMMARY AND OBJECTS OF THE INVENTION

In light of the foregoing, it is apparent that there exists a need for a single method and apparatus for ensuring cache coherency during boundary transactions. This may be accomplished by managing boundary transactions through a self-snooping mechanism for a computer system comprising multiple bus agents including a plurality of caching agents an input-output ("I/O") subsystem and a memory subsystem, all of which are coupled to a processor-system bus. For certain boundary conditions, a first caching agent initiates a request and places such request directly on the processor-system bus without performing an internal cache lookup. In that event, all caching agents, including the first caching agent (i.e., the requesting agent), concurrently snoop the processor-system bus. In response to the request, the requesting agent as well as the other caching agents perform internal cache lookups to successful manage the boundary transaction in a more efficient manner while still maintaining cache coherency.

BRIEF DESCRIPTION OF THE DRAWINGS

The features and advantages of the present invention will become apparent from the following detailed description of the present invention in which.

DETAILED DESCRIPTION OF THE PRESENT INVENTION

A method and apparatus for providing a self-snooping mechanism is described in detail. In the following description, for purposes of explanation, specific details such as processor configurations, bus hierarchies, components and the like are set forth in order to provide a thorough understanding of the present invention. However, it will be apparent to one skilled in the art that the present invention may be practiced without these specific details. In other instances, well known structures, devices, functions, and procedures are not shown in block diagram form in order to avoid obscuring the present invention. It should be noted that the present invention can be applied to a variety of different processor architectures and can be practiced in a variety of manners, such as by a single or multiple chip implementation.

Additionally, three boundary transactions are managed by the self-snooping mechanism in lieu of the other conventional measures as previously discussed. However, it is contemplated that the particular uses of the self-snooping mechanism is design dependent so that these chosen boundary transactions should not be construed as a limitation to the scope of the present invention.

Figure 1:
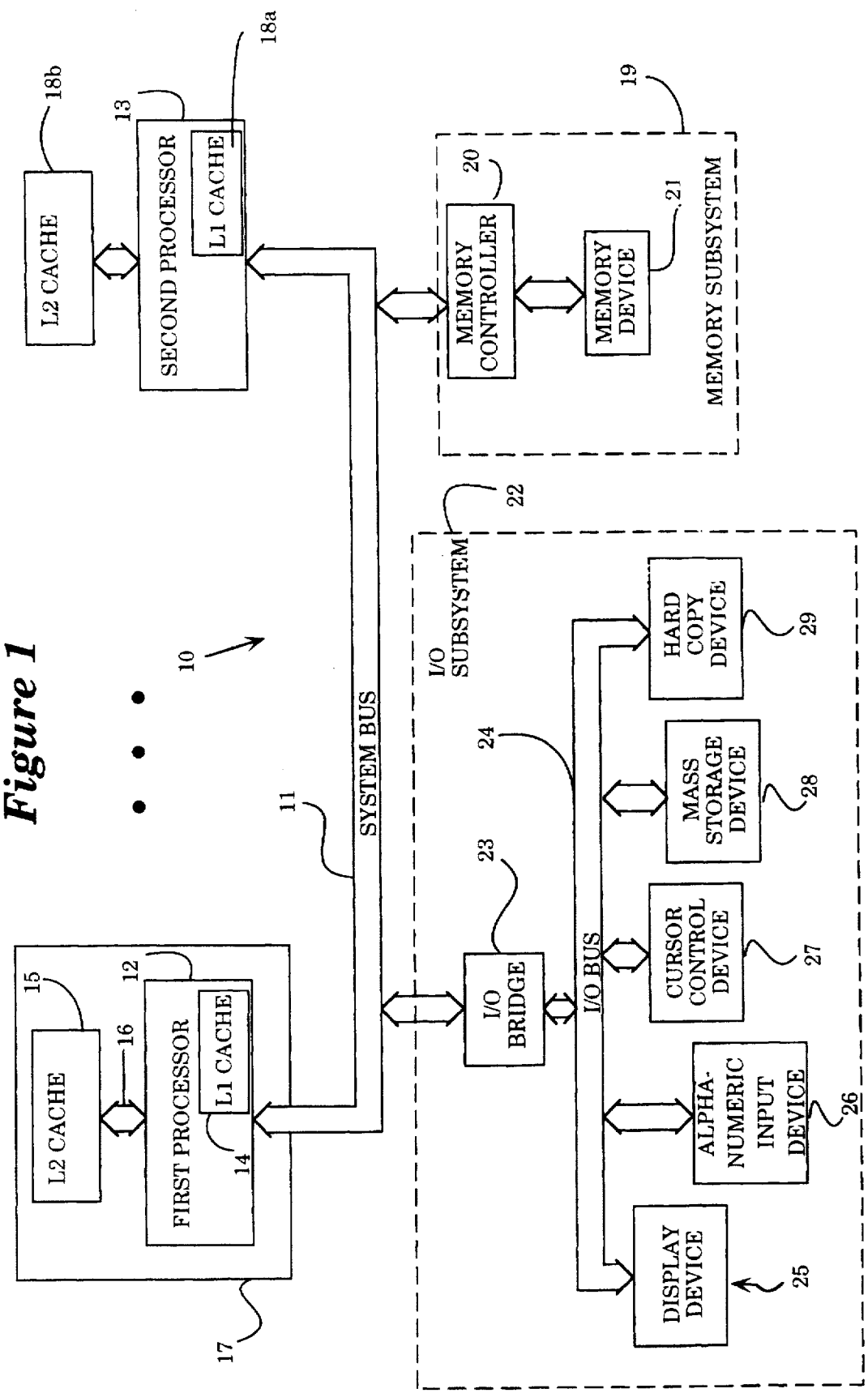
FIG. 1 illustrates a preferred embodiment a multi-processor computer system incorporating the present invention.

Referring to FIG. 1, an embodiment of a multi-processor computer system 10 utilizing the present invention is illustrated. The computer system generally comprises a processor-system bus 11 being a synchronous latched bus clocked at a predetermined clocking frequency ("CLK"). The processor-system bus 11 includes address, data and control buses for communicating information to a plurality of bus agents, which includes a plurality of caching agents such as a first and second processors 12 and 13. The first and second processors 12 and 13 are Intel® 80×86-compatible processors; however, the present invention may be utilized in any type of processor. Although only two processors 12 and 13 are illustrated in this embodiment, it is contemplated that more than two processors, and commonly four (4) processors, could be employed within the multi-processor computer system 10.

As shown in FIG. 1, the first processor 12 includes a small, extremely fast internal cache memory, commonly referred to as a level-one cache memory ("L1 cache") 14, for temporarily storing data and instructions on-chip. In addition, a larger, slower level-two cache memory ("L2 cache") 15 is coupled to the first processor 12 through a backside bus 16 for additional temporary storage of data and instructions. In this embodiment, both the L1 and L2 caches 14 and 15 are configured as writeback caches and therefore follow M.E.S.I. protocol; however, it is possible for such caches to be configured as "write-thorough" caches and would thereby follow conventional Invalid/Valid protocol. The first processor 12, L1 cache 14 and L2 cache 15 are encapsulated within a same chip package 17, although it is contemplated that the L1 and L2 caches 14 and 15 could be interconnected external to the chip package 17 as shown by the second processor 13 having its L2 cache 18b externally coupled thereto while the L1 cache 18a is still on-chip.

Besides being coupled to the first processor 12, the processor-system bus 11 is coupled to the second processor 13 for processing information in conjunction with the first processor 12. The second processor 13 may comprise a parallel processor having an architecture identical or similar to the first processor 12. Alternatively, the second processor 13 may comprise a co-processor, such as a digital signal processor.

As further shown in FIG. 1, the processor-system bus 11 provides access to a memory subsystem 19 and an input/ output ("I/O") subsystem 22. The memory subsystem 19 includes a memory controller 20 coupled to the processor-system bus 11 to provide an interface for controlling access to at least one memory device 21 such as dynamic random access memory ("DRAM"), read only memory ("ROM"), video random access memory ("VRAM") and the like. The memory device 21 stores information and instructions for the plurality of processors 12 and 13.

The I/O subsystem 22 includes an I/O bridge 23 being coupled to the processor-system bus 11 and a conventional I/O bus 24. The I/O bridge 23 is an interface between the I/O bus 24 and the processor-system bus 11 which provides a communication path (i.e., gateway) for devices on either the processor-system bus 11 or the I/O bus 24 to access or transfer information between devices on the I/O bus 24 or the processor-system bus 11, respectively. The I/O bus 24 communicates information between at least one peripheral device in the computer system 10 including, but not limited to a display device 25 (e.g., cathode ray tube, liquid crystal display, etc.) for displaying images; an alphanumeric input device 26 (e.g., an alphanumeric keyboard, etc.) for communicating information and command selections to one of the processors 12 and 13; a cursor control device 27 (e.g., a mouse, etc.) for controlling cursor movement; a mass data storage device 28 (e.g., magnetic tapes, hard disk drive, floppy disk drive, etc.) for storing information and instructions; and a hard copy device 29 (e.g., plotter, printer, etc.) for providing a tangible, visual representation of the information. It is contemplated that the computer system shown in FIG. 1 may employ some or all of these components or all of these components or different components than those illustrated.

The computer system incorporating the present invention utilizes the writeback cache configuration following the M.E.S.I. protocol as briefly discussed. The state information within the cache lines includes a number of state bits whose value is dependent on both transactions performed by the requesting agent and snooping activities performed in response to transactions generated by other caching agents as well as certain boundary transactions. The state information reflects four states defined as follows:

[M]-MODIFIED: This state indicates a cache line is (i) exclusively available only in this cache so that all other caches are Invalid (defined below), and (ii) modified so that main memory's copy is stale. A cache line in Modified state ("modified cache line") can be read or updated locally in the cache without accessing main memory. Moreover, since the modified cache line is the current copy of available data, it is the responsibility of the caching agent governing the Modified cache line to writeback the modified cache line to main memory on snoop accesses to it.

[E]-EXCLUSIVE: This state indicates a cache line (i) is exclusively available in only this cache so that all other caches are Invalid (defined below), and (ii) is not in the Modified state (i.e., main memory also has a valid copy). Writing to a cache line in Exclusive state causes that cache line to change to the Modified state and to inform other caches or memory of such case. On a snoop access, it is the responsibility of the main memory to provide the data.

[S]-SHARED: This state indicates that a cache line (i) is potentially shared with other caches and (ii) is not in Modified state. The same cache line may exist in one or more other caches. On a snoop access, it is the responsibility of the main memory to provide the data.

[I]-INVALID: This state indicates that a cache line is not available in the cache. A read to this cache line will result in a "miss", causing the caching agent to execute a cache line fill (i.e., fetch the entire line on the system bus and copy it into the cache).

A writeback cache state table identifying the transactions which may require state changes in the requesting agent as well as other caching agents are illustrated in Table 1 immediately below.

TABLE 1

| CURRENT STATE | RESPONSE AFTER READ OPERATION TO MEMORY | RESPONSE AFTER WRITE OPERATION TO MEMORY |
| --- | --- | --- |
| M | Read Hit: Read data from a particular cache line(s) in the requesting agent | Write Hit: Update the particular cache line(s) within the requesting agent. |
| E | Read Hit: Read data from a particular cache line(s) in the requesting agent | Write Hit: Update the particular cache line(s) within the requesting agent; Change current state to "M" |
| S | Read Hit: Read data from a particular cache line(s) in the requesting agent | Write Hit: Update the particular cache line(s) within the requesting agent; Change current state to "M"; Invalidate other shared caching agents. |
| I | Read Miss: Allocate a cache line | Write Miss: Allocate a cache line; Read cache line into cache; Update the cache line with a write; Change cache state of the requesting agent to "M"; Invalidate other shared caching agents. |

In the computer system illustrated in FIG. 1, the processor-system bus 11 is pipelined, supporting multiple outstanding bus transactions, preferably eight transactions. Activity on the processor-system bus is organized into operations, transactions, and phases. An operation is a bus procedure that appears atomic to software such as read—modify—write bus-lock sequence. Executing an operation usually requires one transaction, but may require multiple transactions or a single transaction with multiple data transfers. A transaction is the set of bus activities related to a single request, which could be directed to transferring data, inquiring or changing cache states and other related requests.

Figure 2:
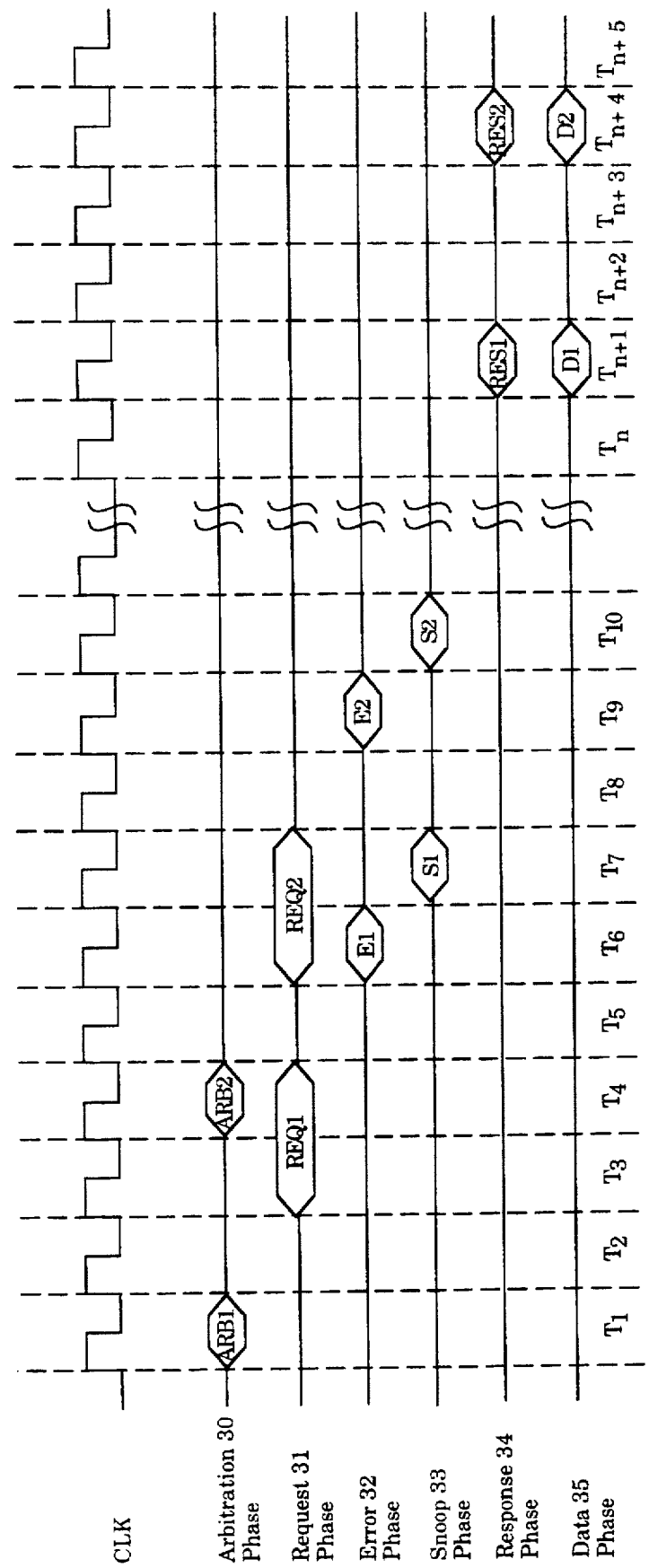
FIG. 2 is a timing diagram of a pair of pipelined bus transactions occurring on the processor-system bus of the multi-processor computer system illustrated in FIG. 1.
Figure 3:
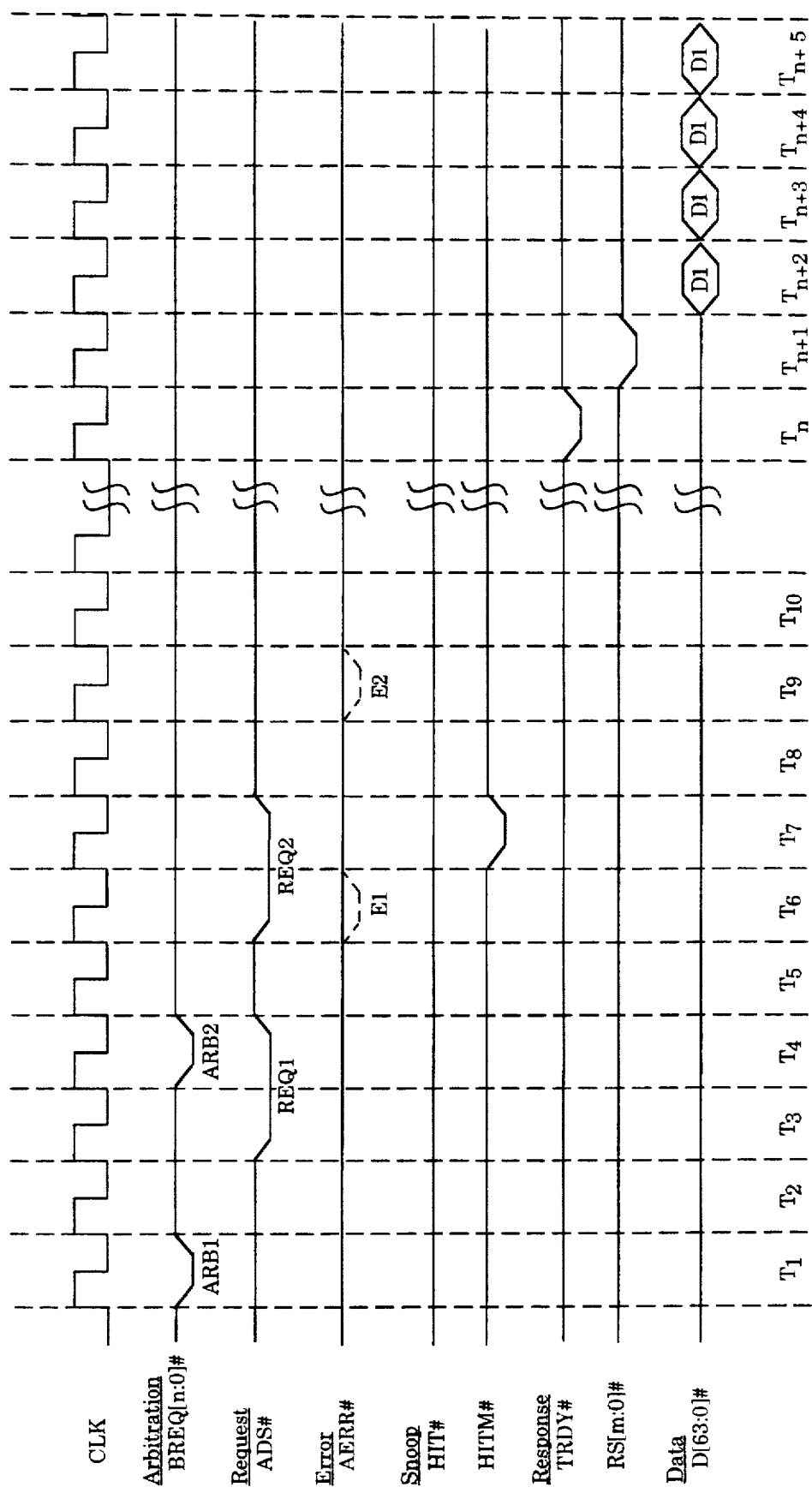
FIG. 3 is a more-detailed timing diagram of the pair of pipelined bus transactions illustrated in FIG. 2.

A transaction includes at most six distinct phases; namely, (1) Arbitration; (2) Request; (3) Error; (4) Snoop; (5) Response; and (6) Data. Since the processor-system bus 11 is pipelined, different phases from different transactions can overlap as illustrated in FIGS. 2 and 3. Such overlapping (pipelining) improves bus performance but requires complex protocol to control.

Referring to FIG. 2, every transaction in the computer system incorporating the present invention begins with an Arbitration Phase 30 if a requesting agent does not have ownership of the processor-system bus. The second phase is the Request Phase 31 in which the requesting agent drives a request including request information identifying the transaction type (memory read, memory write, I/O read, I/O write, etc.) and the transaction address (i.e., the address of the variable being read, written to and the like). The next phase of a transaction is an Error Phase 32 being multiple bus cycles, (preferably three CLK cycles) after the Request Phase 31 begins. In the Error Phase 32, if a parity error is detected with respect to the transaction address, the requesting agent is signaled to re-transmit the request. Otherwise, the transaction progresses to the fourth phase of a transaction, a Snoop Phase 33, which is the paramount phase in maintaining cache coherency.

As illustrated, the Snoop Phase 33 starts four or more cycles after commencement of the Request Phase 31 or three clocks after a Snoop Phase of a previous transaction, whichever is later. The Snoop Phase 33 indicates if the transaction address is valid and/or modified in any caching agent's cache through activation or deactivation of a plurality of control signals (discussed in detail in FIG. 3). The Response Phase 34 basically operates as an acknowledgment to the Request Phase 31 by indicating, among other things whether the transaction failed or succeeded, type of response needed and whether or not the transaction requires the Data Phase 35 for data transfer. Referring now to FIG. 3, particular signals associated with the above-discussed phases is illustrated. First, in the Arbitration Phase 30, the requesting agent asserts one of an encoded bus request signal "BREQ[n:0]#" (hereinafter referred to as the BREQ$_n$# signal 36) where "#" designates the BREQ$_n$# signal as active-low and the number of BREQ$_n$# signals ("n") is equivalent to the number of processing agents which can be coupled to the processor-system bus. In the preferred embodiment, "n=3" so that up to four symmetric processing agents can be simultaneously employed within the computer system. Which particular BREQ$_n$# signal is asserted designates which symmetric processing agent seeks ownership of the processor-system bus. As shown in FIG. 3, the first processor being associated with the BREQ$_0$# signal seeks ownership of the processor-system bus. Besides the BREQ$_n$# signals, the Arbitration Phase 30 further includes other signals such as a bus-lock signal ("LOCK#") to establish a bus-lock and a priority agent bus request ("BPRI#") signal for obtaining bus ownership on behalf of the I/O subsystem or the memory subsystem.

In the Request Phase, for handshaking purposes, an address strobe ("ADS#") 37 is used to indicate that the request and address information is being placed on the processor-system bus for handshaking purposes. The ADS# 37 is active for one bus clock cycle and inactive for the next bus clock cycle since there is always an idle clock between the request phases for bus turnaround.

In the Error Phase, if a parity error is detected with respect to the address information during the Request Phase, an AERR# signal 38 is asserted on the processor-system bus 11, requiring the requesting agent to re-transmit the request and address information.

As previously discussed during the Snoop Phase 33, a caching agent activates at least one of two control signals, namely HIT# and HITM# signals 39 and 40, if a particular cache line in the caching agent's cache contains the data corresponding to the address information provided by the request. If the cache line is in Modified state (i.e., a modified cache line), the caching agent asserts the HITM# signal 40. Otherwise the caching agent asserts the HIT# signal 39, indicating the cache line is in Shared or Exclusive state.

provided the caching agent plans to retain in its cache after the Snoop Phase.

As shown in FIG. 3, showing only the Snoop, Response and Data Phase results for the first transaction for clarity sake, a caching agent, for example the requesting agent, asserts its HITM# signal after self-snooping (discussed in more detail in FIGS. 4–8) indicating that the requesting agent includes a modified cache line containing data corresponding to the address information of the first request. Concurrently, it deasserts the HIT# signal 39. All the bus agents update their cache states and report HIT#/HITM# based upon the current state of the data and the type of request (read or write) being issued on the bus, as shown in Table 2 below.

TABLE 2

| CURRENT STATE | SNOOP RESPONSE FOR A READ TRANSACTION | SNOOP RESONSE FOR A WRITE TRANSACTION |
|---|---|---|
| M | Read Hit:<br>1. Modified caching agent asserts HITM#.<br>2. Updates its cache state M → S.<br>3. Performs Implicit Writeback Data Transfer. | Write Hit:<br>1. Modified caching agent asserts HITM#.<br>2. Updates its cache state M → I.<br>3. Performs Implicit Writeback Data Transfer. |
| E | Read Hit:<br>1. Caching agent asserts HIT# to retain cache line.<br>2. Updates its cache state E → S. | Write Hit:<br>1. Caching agent deasserts HIT#.<br>2. Updates its cache state E → I. |
| S | Read Hit:<br>1. Caching agent asserts HIT# to retain cache line.<br>2. Updates its cache state S → S. | Write Hit:<br>1. Caching agent deasserts HIT#.<br>2. Updates its cache state S → I |
| I | Read Miss:<br>1. Caching agent deasserts HIT#.<br>2. Updates its cache state I → I. | Write Miss:<br>1. Caching agent deasserts HIT#.<br>2. Updates its cache state I → I. |

More importantly, the requesting agent now assumes responsibility for writing back the entire modified cache to the processor-system bus to be read by the memory subsystem 19. In this embodiment, a memory agent, such as the memory controller 20 asserts a TRDY# signal 42 when it is able to read the modified cache line within the requesting agent. Moreover, it further asserts an encoded response signal 43 "RS[m:0]#" (where "m" is preferably equal to "2" but can be any predetermined whole number depending on the number of response types supported by the computer system 10) to signal a normal response, or in this case, an implicit writeback response to occur (which is discussed later).

Unfortunately, although a pipelined computer system is efficient and has better overall performance than sequential systems, a pipelined computer system can pose several problems. For example, in FIG. 2, a first request signal ("REQ1") is driven during bus clock T$_3$ and a second request signal ("REQ2") is driven during bus clock T$_6$. If REQ1 and REQ2 signals both involve the same address, cache consistency is required for proper execution. This is accomplished during the Snoop Phase.

In the Snoop Phase of the present invention, all caching agents drive their snoop results and participate in cache coherency resolution. Unlike prior Intel® Microprocessor Architectures which are designed so that only non-requesting agents snoop transactions initiated by the requesting agent, the present invention further employs a self-snooping mechanism to allow the requesting agent to snoop its own transactions in a manner identical to the other caching agents, provided such transactions constitute boundary transactions as previously defined. For this application, three types of boundary conditions are discussed for illustrative purposes; however, it is contemplated that there could exist many more of such boundary conditions depending on the specific configuration of the computer system so that these particular boundary conditions should not be construed as a limitation to the scope and spirit of the present invention.

As stated, at least two signals are used to indicate whether a particular cache line is valid or invalid and whether one of the caching agents will provide the requested data. A first of these two signals is a HIT# signal which is an active-low signal indicating that a particular caching agent is storing a shared or exclusive copy of the requested data in its cache. A second signal is a HITM# signal which is an active-low signal indicating that a particular caching agent owns a modified copy of the requested data. It is contemplated for pipelined operations as shown in that the cache line states for the first operation need to be updated prior to the Snoop Phase for the second operation. Otherwise, the proper agent(s) may not assert the necessary HIT# or HITM# signals for REQ2.

Figure 4:
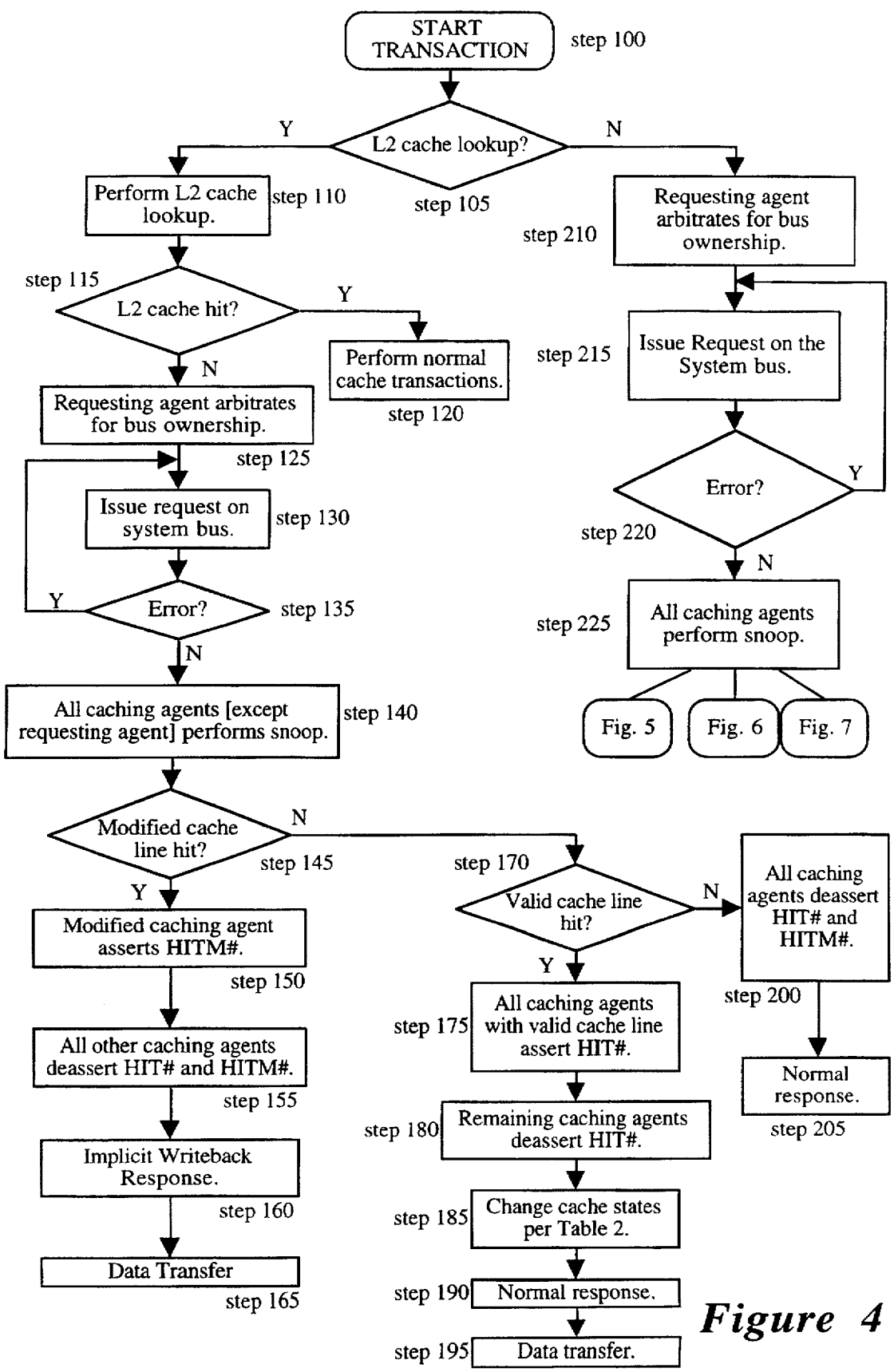
FIG. 4 is a flowchart describing the steps for performing any transaction, including a boundary transaction, on the pipelined processor-system bus of the multi-processor computer system illustrated in FIG. 1.

Referring now to FIG. 4, a flowchart describes the steps followed by any transaction, including boundary transactions requiring the self-snooping mechanism in the Snoop Phase. Initially, a requesting agent determines whether an internal L2 cache lookup is to be performed before placing (i.e., issuing) the request on the processor-system bus (Step 105). If the internal L2 cache lookup is to be performed prior to any issuance of the processor-system bus, indicating that the transaction is not a boundary transaction, the requesting agent performs the internal L2 cache lookup (Steps 110 and 115) searching for a cache line corresponding to the transaction address ("a requested cache line"). If the requested cache line is contained in the L2 cache, the requesting agent completes the transaction according to conventional writeback cache principles of Table 1 above (Step 120).

If the requested cache line is not in the L2 cache, then the requesting agent (e.g., the first processor) arbitrates for control of the processor-system bus during Arbitration Phase (Step 125). Next, the requesting agent issues a request onto the processor-system bus (Step 130). If no errors occur which require aborting the request in the Error Phase (Step 135), all caching agents coupled to the processor-system bus, except the requesting agent, performs an internal snoop in the Snoop Phase (Step 140) to determines whether any of these caching agents has the requested cache line in Modified state, hereinafter referred to as the "modified cache line" (Step 145). If an error occurs, however, the requesting agent is prompted to issue another request.

If any one of the caching agents (other than the requesting agent, of course) has the modified cache line, that caching agent (the "modified caching agent") asserts a HITM# signal during the Snoop Phase (Step 150). In addition, all other caching agents on the processor-system bus 11 deassert a HIT# signal (Step 155) because (i) the modified caching agent deasserts HIT# when it asserts HITM# and (ii) no other caching agent has a valid copy of the cache line. This HITM# signal from the modified caching agent informs every bus agent (e.g. the requesting agent, the memory controller and the like) that the modified caching agent has the most recent version of the requested cache line. As a result, the memory controller observes the HITM# signal and relinquishes responsibility for data return to the modified caching agent. Thus, the modified caching agent has the responsibility to write back the modified cache line during the Data Phase (Steps 160 and 165). This action is termed an "Implicit Writeback Data Transfer," which is discussed in detail in a concurrently filed application entitled "Method And Apparatus For Supporting Partial Write Operations To Memory Which Maintain Cache Coherency" incorporated herein.

The response by the other bus agents to the HITM# signal is dependent on the nature of the request. For example, in the event of a read request to main memory, the presence of a HITM# signal indicates to the memory controller that it should not transfer its version of the requested cache line to the requesting agent. The cache states for this cache line are updated in both the requesting agent and the modified caching agent in the Snoop Phase so that the modified caching agent transfers ownership of the modified cache line to the requesting agent. Two possibilities exist for the transferring cache line ownership. First, the modified caching agent transfers the modified cache line to the requesting agent and changes its cache line to Invalid state, while the requesting agent changes its cache line to Modified or Exclusive state. The second possibility being that both the requesting agent and modified caching agent change their cache states to Shared state and ensure main memory updates its version of the modified cache line.

If none of the caching agents has a modified copy of the cache line, main memory will issue a normal operation response in the Response Phase, which indicates that it will provide the requested cache line in the Data Phase (Steps 190 and 195). However, for cache coherency reasons, a determination must be made as to whether any of these caching agents has a valid copy of the requested cache line, hereinafter referred to as a valid cache line (Step 170). If any of these caching agents have a valid cache line, all such caching agents still wanting to retain the same assert the HIT# signal (Step 175) and the remaining caching agents deassert the HIT# signal (Step 180). Thereafter, the cache states of these cache line(s) is altered according to the nature of the request in Step 130 as shown in Table 2 (Step 185) and main memory issues a response and performs the data transfer (Steps 190 and 195).

For example, for a read request targeted to main memory in a bus-lock operation, each caching agent with a valid cache line alters its cache state from Exclusive state (if only one cache agent has a valid cache line) or Shared state (if more than one caching agent has a valid cache line) to Shared state. The requesting agent also changes its state for that cache line to Shared state since it will receive a copy of the valid cache line in the Data Phase.

If none of the caching agents have a valid cache line, all caching agents deassert both HIT# and HITM# signals (Step 200), requiring main memory to issue a normal response (Step 205) and provide the required cache line (i.e., the data stored within the transaction address.

Figure 6:
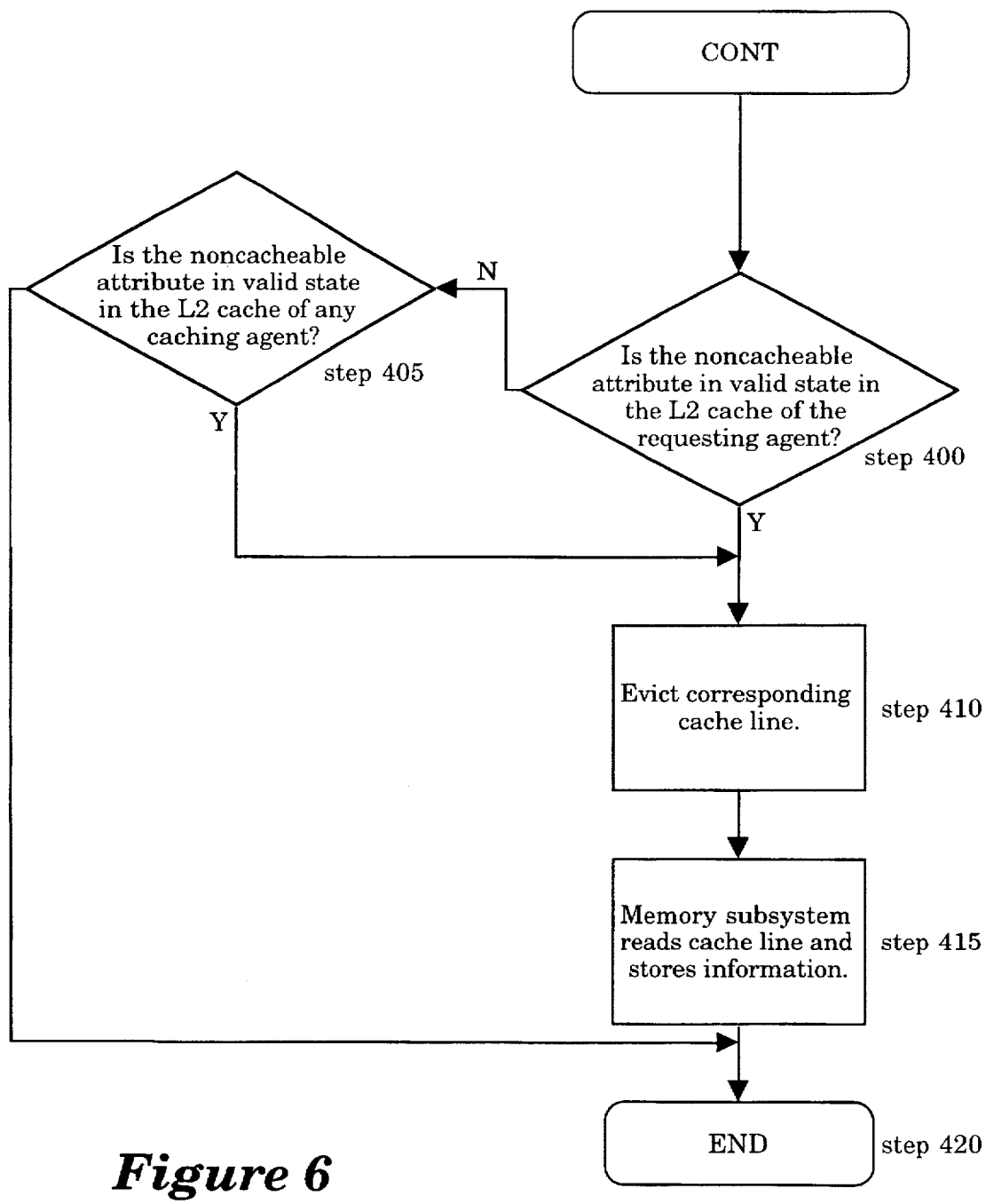
FIG. 6 is a flowchart describing the steps of the self-snooping mechanism to avoid page attribute conflicts.
Figure 7:
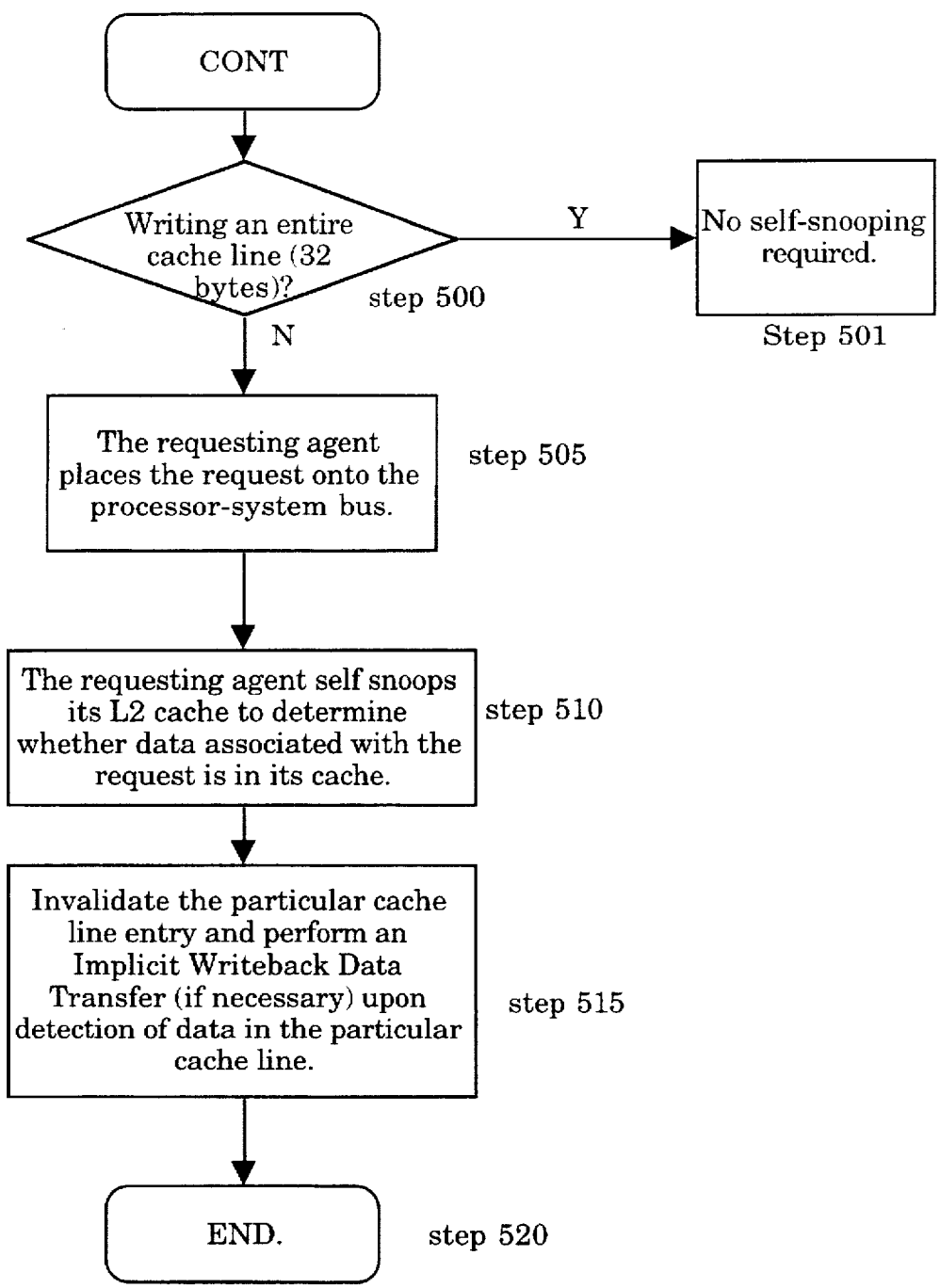
FIG. 7 is a flowchart describing the steps of the self-snooping mechanism allowing the byte enable signal lines to be eliminated from the data bus interface between the L2 cache and the processor of the caching agent.

In the event that internal L2 cache lookup is not selected initially for a particular transaction, indicating a boundary transaction, the requesting agent first arbitrates for control of the processor-system bus (Step 210). Thereafter, the requesting agent immediately issues the request associated with the boundary transaction on the processor-system bus (Step 215). If no errors occur which require aborting the request in the Error Phase (Step 220), all caching agents coupled to the processor-system bus 11, including the requesting agent, performs an internal snooping operation (Step 225). Such snooping is done so that the computer system can successfully complete the boundary transaction, depending on the type of boundary transaction as illustrated in FIGS. 5–7.

Figure 5:
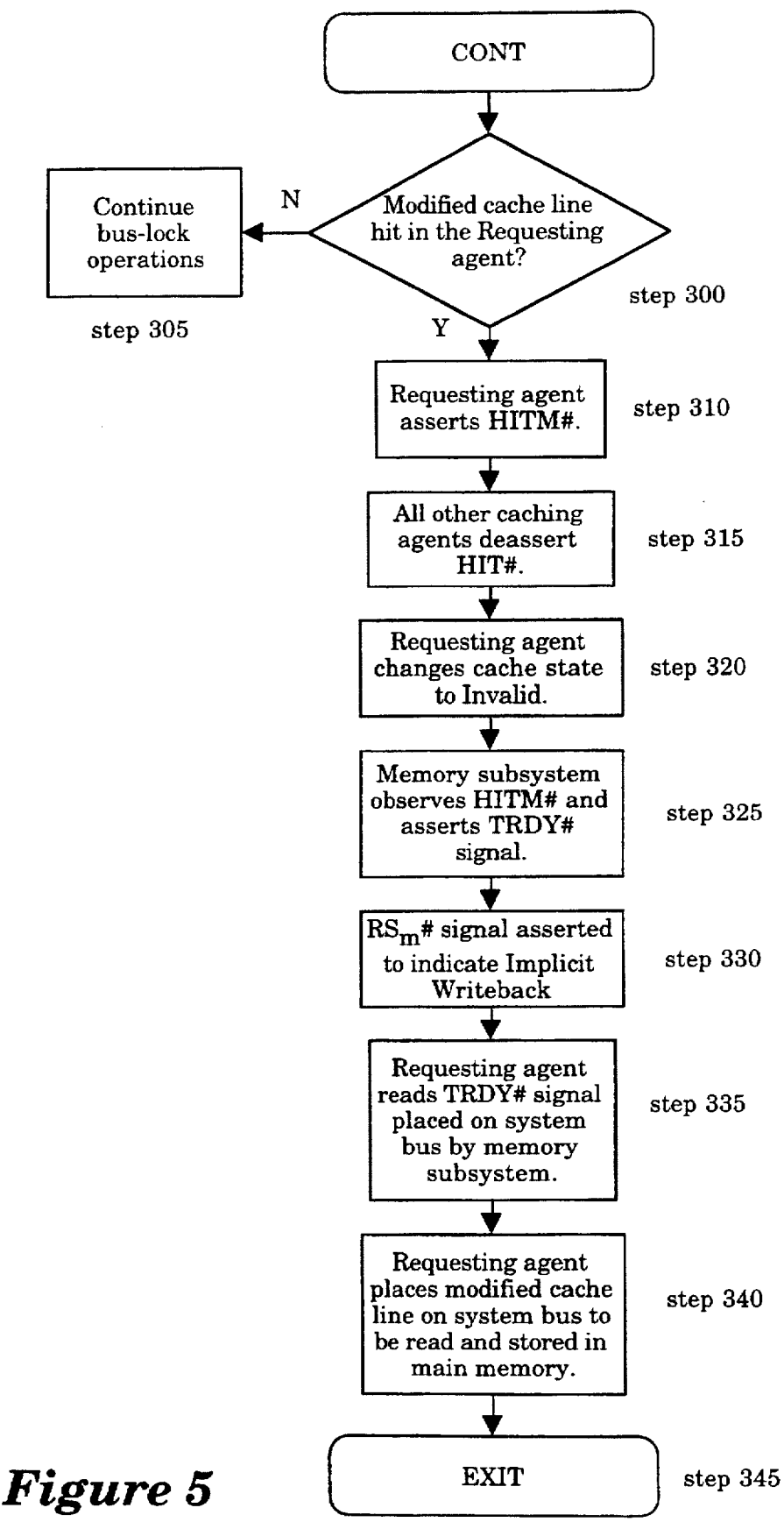
FIG. 5 is a flowchart describing in more detail the steps in the self-snooping mechanism for accessing a bus-lock variable.

Referring to FIG. 5, with respect to a bus-lock, the first determination made is whether the requesting agent has the modified cache line (Step 300). If the requesting agent does not have the modified cache line, continue the bus-lock transaction as normal (Step 305). If so, that requesting agent asserts a HITM# signal during the Snoop Phase (Step 310). In addition, all other caching agents on processor-system bus deassert a HIT# signal because no other caching agent has a valid copy of the cache line (Step 315). This HITM# signal from the requesting agent informs the other bus agents that the requesting agent has the most recent version of the requested cache line. Moreover, to maintain cache coherency, the requesting agent updates its cache state to be Invalid (Step 320).

In the Response Phase, if the HITM# signal was asserted by the requesting agent, the memory subsystem observes the HITM# signal and in response thereto, asserts the TRDY# signal signaling that the memory subsystem has changed its role from a supplier of information to a receiver of information (Step 325). In addition, in Step 330, the $RS_m$# signal 43 is asserted indicating the type of data transfer needed to respond to the particular request (in this case an Implicit Writeback Data Transfer).

In the Data Phase being multiple bus cycles (e.g., two bus cycles) after detection of the TRDY# signal (Step 335), the requesting agent places the entire modified cache line on the processor-system bus i.e., performs an Implicit Writeback Data Transfer (Step 340) and the memory subsystem snarfs the modified cache line off the bus (step 345) and the process ends (Step 350).

Another boundary transaction managed by the self-snooping mechanism occurs as a result of the processing agents being speculative processors (i.e., support speculative instruction execution). A speculative processors acts as an oracle by executing an instruction that may or may not be part of its execution stream in order to pre-cache information necessary to the transaction. If the prediction is accurate, system performance is greatly enhanced because the requisite information has been already cached. However, it is possible that the processor may predict an instruction which is never asserted. This misprediction could cause problems in certain instances.

For example, in the present computer system illustrated in FIG. 1, there exist implementation-defined registers ("range registers") that designate at power-up cacheable and non-cacheable physical memory. In the event of misprediction and the page attribute register (as previously discussed) has re-programmed the memory associated with the mispredicted transaction as non-cacheable, issuing the mispredicted transaction after such re-programming will likely result in a page attribute conflict. Instead of resolving this conflict by ignoring the page attribute register, the self-snooping mechanism is employed.

As shown in FIG. 6, the steps involved to resolve this conflict are as follows. The first determination is whether the non-cacheable attribute is stored with the L2 cache of the requesting agent (Step 400). If such is the case, the cache line is evicted (Step 410) and the cache line is read from the processor-system bus and stored in the memory subsystem (Step 415). Concurrently with the self-snooping operation, of course, is a regular snooping operation by the other caching agents as illustrated in Step 405. Otherwise, if the non-cacheable attribute is not in Valid state (i.e., Shared, Exclusive or Modified state), there is no page attribute conflict so that the transaction ends (Step 420).

Another boundary transaction is a direct result of a chosen implementation of the multi-processor computer system illustrated in FIG. 1, more particularly, the boundary transaction is a direct result of a chosen configuration of the backside bus 16. The backside bus 16 comprises a plurality of data bus lines. In typically computer systems, when writing to a pre-selected number of these data bus lines (usually a multiple of eight), a corresponding byte enable signal line is activated to indicate that the data on those bus lines is valid. However, for internal optimization reasons, these byte enable signal lines are not provided in the backside bus 16 of FIG. 1 due to pin constraints. In lieu of these byte enable signal lines, however, the transaction is sent directly to memory via the processor-system bus. The L2 cache is self-snooped and invalidated using the method described below.

Referring to FIG. 7, the steps to resolve this boundary transaction are as follows. First, a determination is made as to whether the requesting agent is writing to an entire cache line (i.e., 32 bytes) (Step 500). If writing an entire cache line, no self-snooping is required (Step 501). (If not, indicating a partial write request, the requesting agent places the request onto the processor-system bus (Step 505). Thereafter, the requesting agent self-snoops its L2 cache to determine whether data associated with the write request is in its cache (Step 510). Upon ascertaining that such data is within the requesting agent's cache, the requesting agent invalidiates the particular cache line entry and performs an Implicit Writeback Data Transfer, if necessary (Step 515) in accordance to the procedures of FIGS. 2 and 3.

Figure 8:
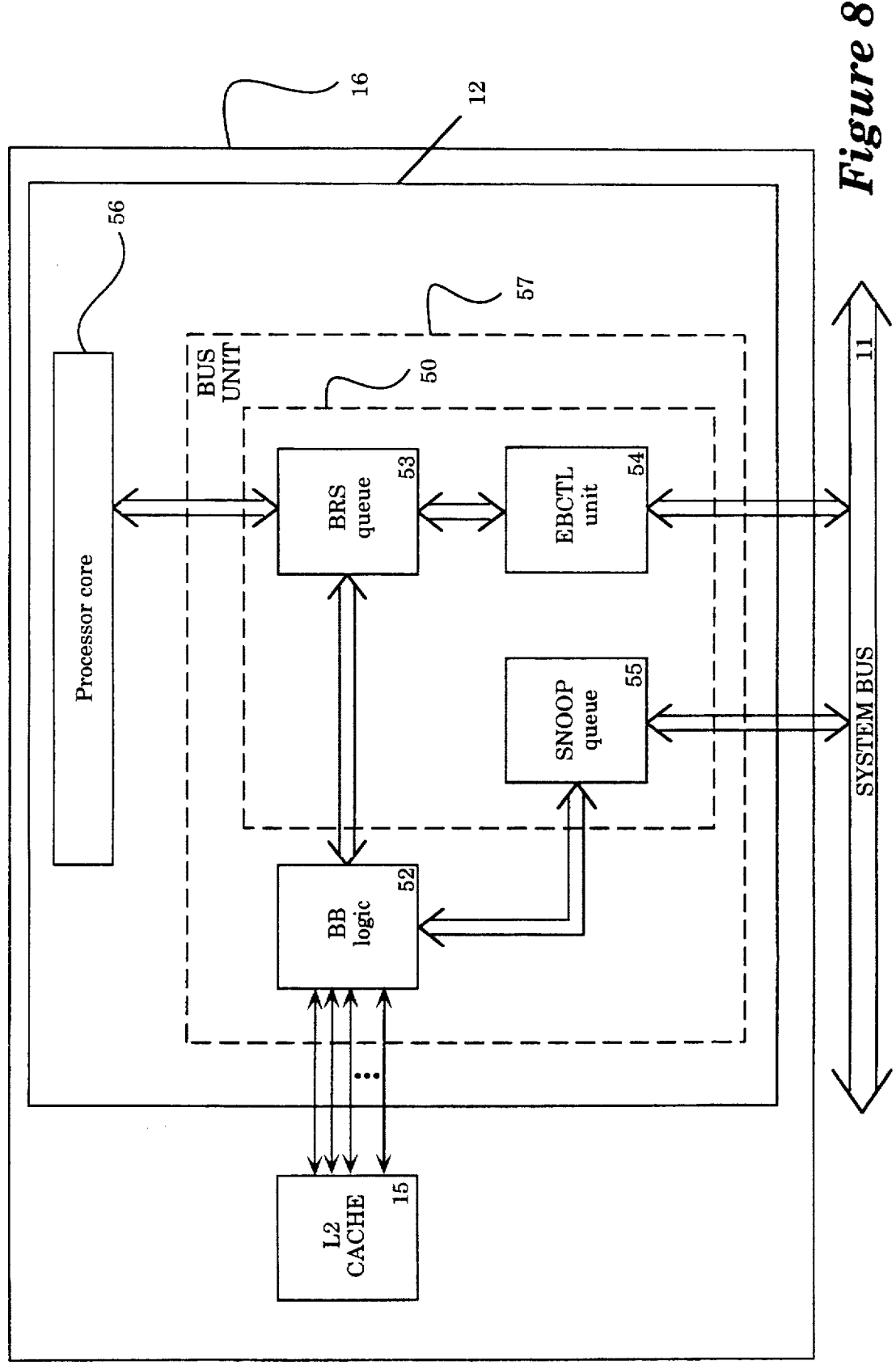
FIG. 8 is a block diagram of a bus unit of a caching agent which is used to determine whether or not a bus request originates from a boundary transaction.

Referring to FIG. 8, each caching agent, such as the first processor 12 in this illustration, is partitioned into multiple interface elements to enable the caching agent to operate with external resources such as other caching agents, memory subsystems, I/O subsystems and the like. One such interface is a bus unit 50 comprising a number of sub-elements including backside bus logic ("BB logic") 51 and an external bus logic ("EB logic") 52. The EB logic 52 further comprises a bus request storage queue ("BRS queue") 53 coupled to an external bus control unit ("EBCTL unit") 54, which is an interface that actually transfers the bus request to the processor-system bus 11. In addition the EB logic 52 further comprises a snoop queue 55 which is coupled to both the processor-system bus 11 and the BB logic 51 in order to forward address information to the BB logic 51 for internal cache lookup during Snoop Phase.

When there exits an instruction miss in L1 cache, an instruction fetch unit or a data cache unit in a processor core 56 generates a bus request and inputs the bus request into the EB logic 52, namely the BRS queue 53. The BRS queue 53 maintains all outstanding bus requests. Normally, most bus requests must first undergo L2 cache lookup which is performed by the BB logic 51. If there is a cache hit or miss, various operations can be performed.

However, for bus requests pertaining to boundary transactions, L2 cache lookup is bypassed; namely, the BB logic 51 does not impede the propagation of the bus request from the BRS queue 53 to the EBCTL unit 54. As a result, upon activation by the EBCTL unit 54, the bus request of the boundary transaction is placed directly on the processor-system bus 11. As a result, this structure of the bus unit 50 in combination with the self-snooping mechanism forces the first processor 12, for boundary transactions, to perform an internal cache lookup concurrently with other caching agents in the multiprocessor computer system for more efficient system operations.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, references to details of the preferred embodiment are not intended to limit the scope of the claims which in themselves recite only those features regarded as essential to the invention.

We claim:

1. A method for exchanging information in a computer system including a bus coupled to a first bus agent and a second bus agent, the method comprising the steps of:

determining by said first bus agent whether a request is based on a boundary transaction, said boundary transaction being a transaction issued onto the bus without initially undergoing an internal lookup in a dedicated cache of said first bus agent; and performing a plurality of operations if said request is based on said boundary transaction, including:
   (i) issuing said request from said first bus agent onto said bus,
   (ii) snooping said bus by at least said first bus agent after issuing said request,
   (iii) issuing a first control signal from said first bus agent onto said bus, the first control signal indicates that said request can only be serviced by accessing said dedicated cache of the first bus agent, and
   (iv) placing data from said dedicated cache onto said bus by the first bus agent to service said request based on the boundary transaction.

2. The method according to claim 1, wherein said boundary transaction includes one of a plurality of transactions including a bus lock and page attribute conflict.

3. The method according to claim 1, wherein prior to said request issuing step, the method further comprises the step of arbitrating by said first bus agent for ownership of said bus.

4. The method according to claim 1, wherein the determining step includes the steps of:

inputting said request into a request storage queue, said request storage queue being an interface between said bus and said first bus agent;

ascertaining whether said request initially requires an internal lookup of said dedicated cache before being issued on said bus; and enabling said request to bypass said internal lookup of said dedicated cache if said request does not initially require said internal lookup before being issued on said bus.

5. The method according to claim 1, wherein the snooping step includes the steps of:

determining whether a particular cache line within said dedicated cache of said first bus agent is storing data corresponding to said request; and determining whether said particular cache line is in a predetermined state.

6. The method according to claim 5, wherein prior to the placing step, the method further includes the steps of:

observing said first control signal by said second bus agent and asserting a second control signal requesting said first bus agent to place data from said dedicated cache onto said bus; and observing said second control signal by said second bus agent.

7. The method according to claim 1, wherein the snooping step includes the steps of:

determining whether a non-cacheable attribute resides in said dedicated cache of said first bus agent; and evicting said non-cacheable attribute from said dedicated cache.

8. The method according to claim 1, wherein the prior to the issuing step, the method further comprises the step of determining whether a partial write request is issued by said requesting agent.

9. The method according to claim 8, wherein the snooping step includes the steps of:

determining whether a particular cache line within said dedicated cache of said first bus agent is storing data corresponding to said partial write request; and initiating a request to invalidate the particular cache line if said first bus agent is storing data corresponding to said partial write request.

10. The method according to claim 1, wherein said data is a particular cache line corresponding to said request.

11. The method according to claim 1, wherein said second bus agent is a memory subsystem.

12. A computer system comprising:

bus means for providing an interconnect between a plurality of bus agents to allow information to be exchanged said plurality of bus agents through a request, based on a boundary transaction, issued on said bus means;

memory means for storing said information; and a plurality of bus agents including a first bus agent and a second bus agent each coupled to said bus means, said first bus agent being further coupled to said memory means, said first bus agent issues the request and snoops said bus means during the boundary transaction after issuing said request to determine whether said request can only be serviced by accessing said memory means, issues a first control signal indicating said request can only be serviced by accessing said memory means and places data from said memory means onto said bus means in order to service said request and to complete the boundary transaction.

13. The computer system according to claim 12, wherein said bus means includes a pipelined bus concurrently supporting at least eight outstanding requests.

14. The computer system according to claim 13, wherein said memory means includes cache memory.

15. The computer system according to claim 12, wherein said first bus agent includes a bus unit coupled to said pipelined bus which transfers said request from a processor core directly to said bus means without initially undergoing an internal lookup of said cache memory.

16. The computer system according to claim 15, wherein said bus unit includes a bus request queue for maintaining said at least eight outstanding requests and an external bus control unit which places said requests onto said bus when activated.

17. The computer system according to claim 12, wherein said first bus agent is coupled to said bus means and said memory means through an interface element, the interface element comprising:

a backside bus logic circuit coupled to said memory means; and an external bus logic circuit coupled to said bus means, said external bus logic circuit including:

a bus request storage queue which stores bus request information, a snoop queue which forwards address information to said backside bus logic circuit, and an external bus control circuit which transfers said request to said bus means.

18. A computer system comprising:

a bus;

a first bus agent coupled to said bus; and a second bus agent coupled to said bus and a cache memory, said second bus agent being capable of (i) issuing a request associated with a boundary transaction on said bus without conducting an initial lookup of said cache memory, and (ii) snooping said bus after issuing said request to maintain cache coherency of the computer system and to complete processing of the boundary transaction.

19. The computer system according to claim 18, wherein said second bus agent is further capable of issuing a first control signal indicating said request can be serviced by accessing said cache memory.

20. The computer system according to claim 19, wherein said second bus agent is further capable of placing data from said cache memory to satisfy said request onto said bus.

21. The computer system according to claim 18, wherein said second bus agent is coupled to said bus and said cache memory through an interface element, the interface element comprising:

a backside bus logic circuit coupled to said cache memory; and an external bus logic circuit coupled to said bus, said external bus logic circuit including:
a bus request storage queue which stores bus request information,
a snoop queue which forwards address information to said backside bus logic circuit, and
an external bus control circuit which transfers said request to said bus.

22. A method for snooping a bus comprising the steps of:

establishing communications between a first bus agent and a second bus agent via the bus, the first bus agent being further coupled to a cache;

placing a request associated with a boundary transaction from said first bus agent on said bus, the boundary transaction is a transaction issued onto the bus by the first bus agent without initially undergoing an internal lookup of the cache; and snooping said bus by said first bus agent after placing said request on said bus; and determining whether said request can be serviced by said first bus agent accessing said cache.

23. The method according to claim 22, wherein prior to said placing step, the method further comprises the step of arbitrating by said first bus agent for ownership of said bus.

24. The method according to claim 23, wherein after said snooping step, the method further comprises the step of issuing a first control signal from said first bus agent onto said bus to indicate that said request can be serviced by accessing said cache.

25. The method according to claim 24, wherein after issuing said first control signal, the method further comprises the step of placing data from said cache onto said bus to service said request.

26. The method according to claim 22, wherein the snooping step includes the steps of:

determining whether a particular cache line within said cache of said first bus agent is storing data corresponding to said request; and determining whether said particular cache line is in a Modified state.

27. The method according to claim 26, wherein prior to the placing step, the method further includes the steps of:

observing said first control signal by said second bus agent and asserting a second control signal requesting said first bus agent to place data from said cache onto said bus; and observing said second control signal by said second bus agent.

28. The method according to claim 22, wherein the snooping step includes the steps of:

determining whether a non-cacheable attribute resides in said cache of said first bus agent; and evicting said non-cacheable attribute from said cache.

29. The method according to claim 22, wherein the prior to the placing step, the method further comprises the step of determining whether said request is a partial write request.

30. The method according to claim 29, wherein the snooping step includes the steps of:

determining whether a particular cache line within said cache of said first bus agent is storing data corresponding to said partial write request; and initiating a request to invalidate the particular cache line if said first bus agent is storing data corresponding to said partial write request.

* * * * *